US010192472B1

United States Patent
Nocon et al.

(10) Patent No.: US 10,192,472 B1
(45) Date of Patent: Jan. 29, 2019

(54) DISPLAY OF A FLOATING IMAGE WITH DEPTH ENHANCEMENT

(71) Applicant: Disney Enterprises, Inc., Burbank, CA (US)

(72) Inventors: Nathan Nocon, Valencia, CA (US); Elliott Baumbach, Porter Ranch, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/985,502

(22) Filed: May 21, 2018

(51) Int. Cl.
*G06F 3/14* (2006.01)
*G09G 3/00* (2006.01)
*G09G 3/36* (2006.01)

(52) U.S. Cl.
CPC ........... *G09G 3/003* (2013.01); *G06F 3/1423* (2013.01); *G09G 3/36* (2013.01)

(58) Field of Classification Search
CPC ....... G09G 3/003; G09G 3/36; H04M 1/0268; G07F 17/3213; G07F 17/3211; G07F 17/32
See application file for complete search history.

(56) References Cited

U.S. PATENT DOCUMENTS

| 7,002,604 | B1 * | 2/2006 | Barrus | G06T 3/606 345/530 |
| 2007/0293299 | A1 * | 12/2007 | Aida | G07F 17/3211 463/20 |
| 2014/0118271 | A1 * | 5/2014 | Lee | G06F 3/0488 345/173 |

* cited by examiner

*Primary Examiner* — Robert J Craddock
(74) *Attorney, Agent, or Firm* — Farjami & Farjami LLP

(57) ABSTRACT

According to one implementation, an image display system includes a computing platform having at least one processor and a system memory storing a software code. In addition, the image display system includes a display screen having a front display face and a side display face, and a base including a motor coupled to a rotor for rotating the display screen. The at least one processor executes the software code to render a two-dimensional (2D) graphic on the front display face of the display screen, and to render a visual effect on the side display face of the display screen. The at least one processor further executes the software code to use the motor and the rotor to spin the display screen to cause appearances of the 2D graphic as a floating image and the visual effect as a volumetric enhancement to the floating image.

20 Claims, 13 Drawing Sheets

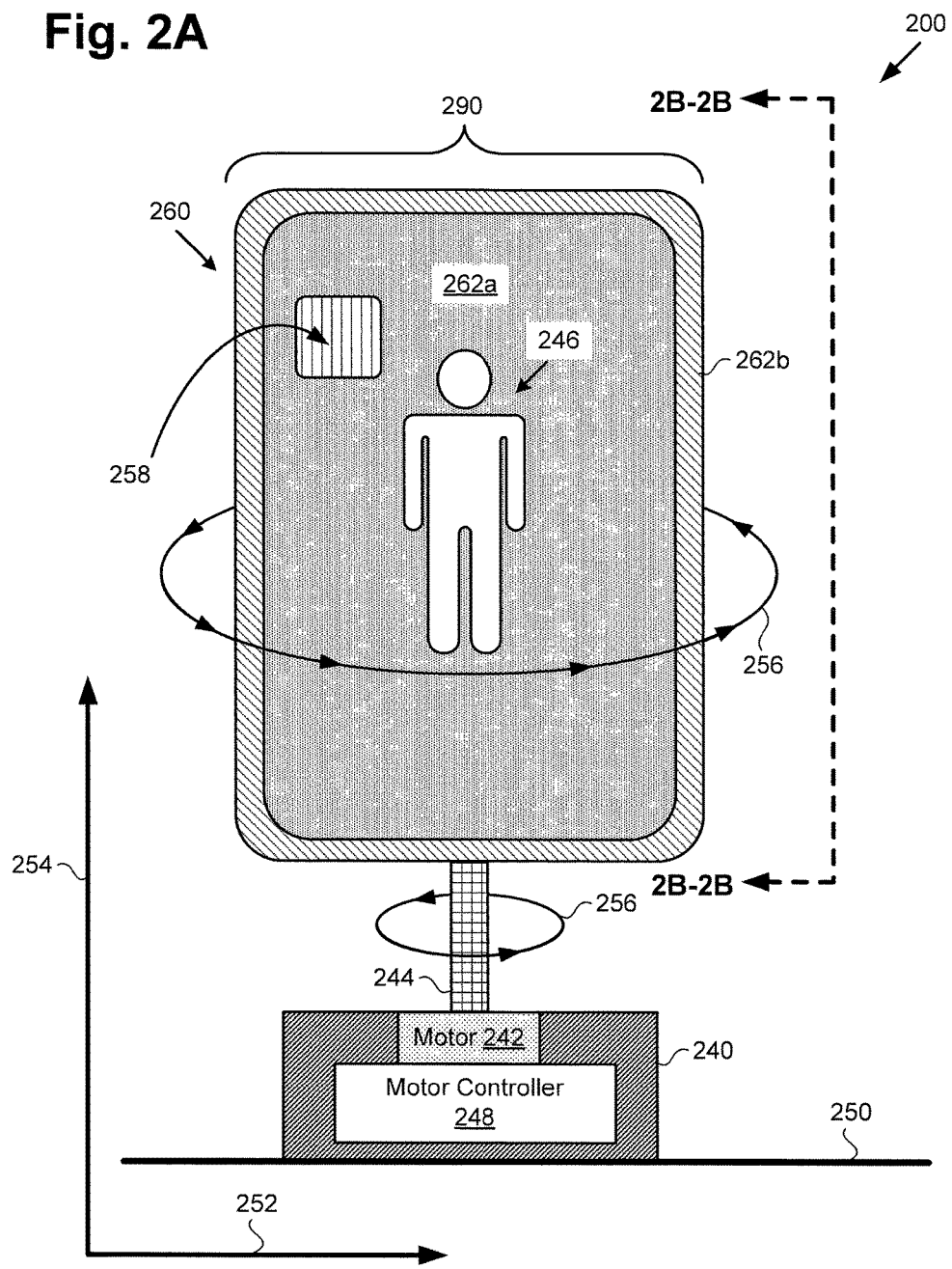

US 10,192,472 B1

DISPLAY OF A FLOATING IMAGE WITH DEPTH ENHANCEMENT

BACKGROUND

Advances in computer technology and software have made possible the generation of richly featured virtual characters capable of simulating interactivity with a human viewer of the virtual character. The illusion of interactivity can be further enhanced when the virtual character is displayed as a three-dimensional (3D) image, apparently independent of the display system generating it. For example, the image of the virtual character may be shown as a holographic image, or may be shown as an image that appears to float in space. However, conventional techniques for displaying holographic or floating images typically utilize sophisticated optical arrays to project the image for viewing, which can limit the environments and use cases in which providing such 3D imagery is practical.

SUMMARY

There are provided systems and methods for displaying a floating image with depth enhancement, substantially as shown in and/or described in connection with at least one of the figures, and as set forth more completely in the claims.

BRIEF DESCRIPTION OF THE DRAWINGS

FIG. 2A shows a diagram of an exemplary image display system, according to another implementation;

DETAILED DESCRIPTION

Figure 1A:
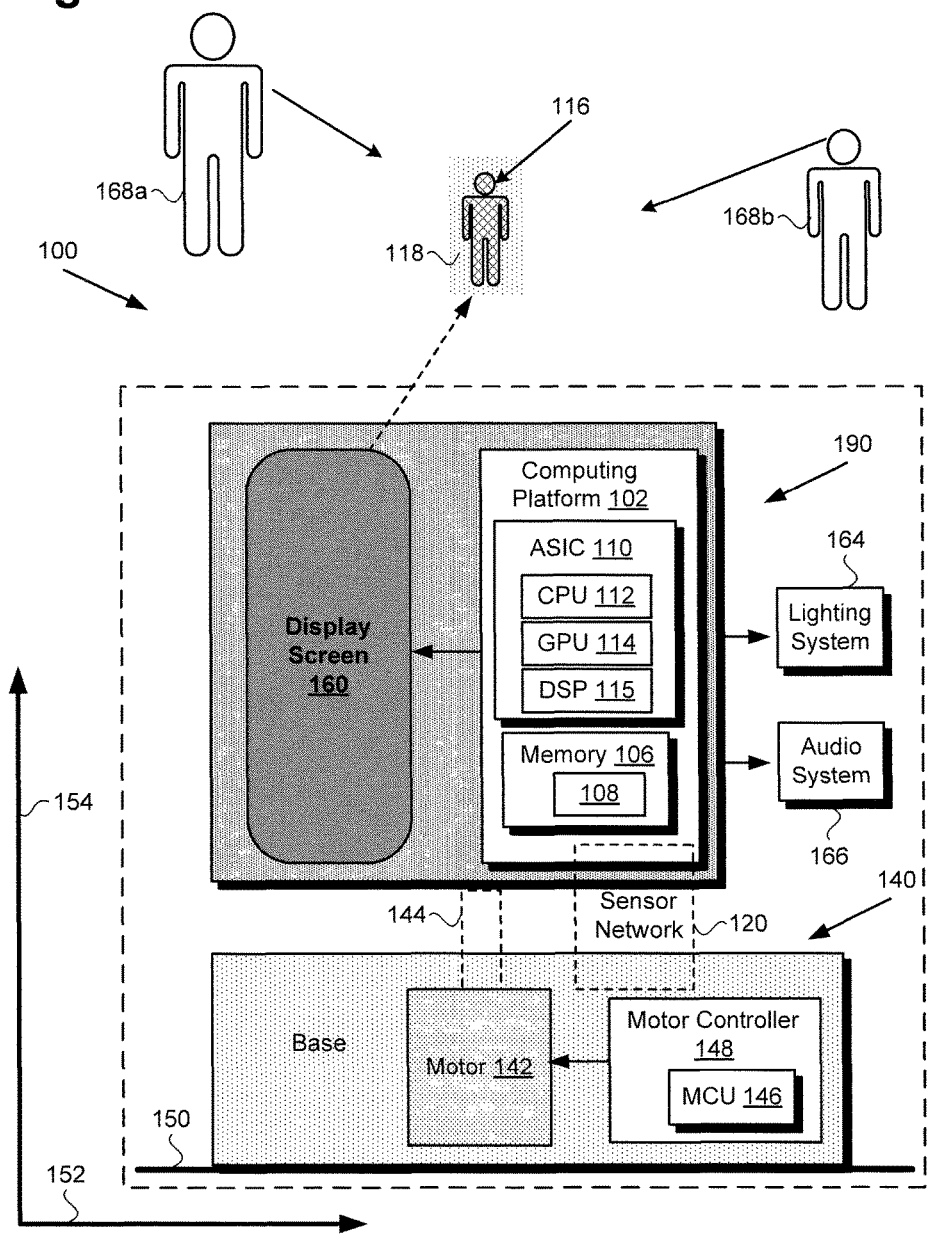
FIG. 1A shows a diagram of an exemplary image display system, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for displaying a floating image with depth enhancement that overcome the drawbacks and deficiencies in the conventional art. FIG. 1A shows a diagram of exemplary image display system 100, according to one implementation. As shown in FIG. 1A, image display system 100 includes floating image and depth effect generator 190 configured to rotate, and coupled to stationary base 140 by rotor 144.

Floating image and depth effect generator 190 includes display screen 160 and computing platform 102 communicatively coupled to display screen 160, as well as to lighting system 164, and audio system 166. As further shown in FIG. 1A, computing platform 102 includes application specific integrated circuit (ASIC) 110 including central processing unit (CPU) 112 implemented as a hardware processor, graphics processing unit (GPU) 114, and may further include digital signal processor (DSP) 115. Computing platform 102 also includes system memory 106 implemented as a non-transitory storage device storing software code 108.

As further shown in FIG. 1A, base 140 includes motor 142 for rotating rotor 144 and floating image and depth effect generator 190, and motor controller circuit 148 including motor control unit (MCU) 146. Base 140 is situated on surface 150, which may be a floor or any other substantially horizontal surface. In addition, FIG. 1A shows horizontal axis 152 substantially parallel to surface 150, and vertical axis 154 substantially perpendicular to surface 150. Also shown in FIG. 1A are sensor network 120 bridging base 140 and floating image and depth effect generator 190, floating image 116 having depth enhancement or volumetric enhancement 118 (hereinafter "volumetric enhancement 118"), and viewers 168a and 168b of floating image 116 and volumetric enhancement 118 to floating image 116 (also herein "users 168a and 168b"). It is noted that the combination of computing platform 102 of floating image and depth effect generator 190, sensor network 120, and motor controller circuit 148 of base 140 enable the necessary time synchronization between the revolutions per second (rps) of motor 142 and rotor 144, and the frame rate in frames per second (fps) at which display screen 160 renders images.

It is further noted that, as defined for the purposes of the present application, the term "volumetric enhancement" refers to an apparently three-dimensional (3D) feature displayed in combination with a visual image. For example, where the visual image depicts a wizard holding a magic wand, a volumetric enhancement to the visual image may take the form of magic dust appearing to be emitted from the wand and swirling around the wizard. As another example, where the visual image depicts another type of character or object, a volumetric enhancement to the visual image may take the form of a fog or mist appearing to envelope the character or object. As yet another example, a volumetric enhancement to a visual image may take the form of one or more words and/or numbers appearing to be displayed on the surface of a transparent cylinder encircling a character or object.

Moreover, as used in the present application, the terms "central processing unit" or "CPU" and "graphics processing unit" or "GPU" have their customary meaning in the art. That is to say, a CPU includes an Arithmetic Logic Unit (ALU) to for carrying out the arithmetic and logical operations of computing platform 102, as well as a Control Unit (CU) for retrieving programs, such as software code 108, from system memory 106. A GPU is configured to reduce the processing overhead of the CPU by performing computationally intensive graphics processing tasks.

In addition, for the purposes of the present application, the term "perspective" refers to the particular viewing angle from which an object, virtual object, or image is viewed by an observer. Referring to FIG. 1A, for example, a perspective of floating image 116 and volumetric enhancement 118 to floating image 116 refers to the viewing angle of an observer of floating image 116 and volumetric enhancement 118 to floating image 116 with respect to a circle substantially concentric with rotor 144 of image display system 100, in a plane substantially perpendicular to vertical axis 154.

Furthermore, the terms "render" and "rendering" are defined to mean causing one or more images to appear on a display screen, such as display screen 160. Thus, rendering an image may mean causing an entirely new image to appear on the display screen, or refreshing an image previously appearing on the display screen. With respect to the term "privacy screen," as used in the present application, privacy screen refers to a film or a structure, such as a louvered structure, affixed to a display screen so as to prevent viewing of the display screen outside of a predetermined viewing angle.

It is also noted that although FIG. 1A shows two users 168a and 168b, that representation is provided merely for conceptual clarity. More generally, users 168a and 168b may correspond to a single user, or to more or many more than two users who may be positioned so as to view floating image 116 and volumetric enhancement 118 to floating image 116 from a variety of perspectives. For example, in some implementations, users 168a and 168b may be situated so as to view floating image 116 and volumetric enhancement 118 from a number of discrete perspectives, such as three discrete perspectives located approximately 120° apart on an imaginary 360° circle surrounding floating image 116. However, in other implementations, users 168a and 168b may be able to view floating image 116 and volumetric enhancement 118 from the perspective of any position on such an imaginary circle surrounding floating image 116.

In some implementations, one or more of users 168a and 168b may be interactively engaged with floating image 116 via image display system 100 including computing platform 102, lighting system 164, audio system 166, sensor network 120, and floating image and depth effect generator 190. That is to say, in those implementations, CPU 112 of ASIC 110 may be configured to execute software code 108 to utilize lighting system 164, audio system 166, sensor network 120, GPU 114, and floating image and display screen 160 to create and/or maintain the illusion that floating image 116 is responsive to one or more of users 168a and 168b.

Although FIG. 1A depicts lighting system 164 and audio system 166 as communicatively coupled to, but not structurally integrated with, floating image and depth effect generator 190, that representation is merely exemplary. In other implementations, one or both of lighting system 164 and audio system 166 may be structurally integrated with floating image and depth effect generator 190. Thus, in various implementations, floating image and depth effect generator 190 can include one or more of lighting system 164 and audio system 166, in addition to computing platform 102 and display screen 160.

Lighting system 164 may include lighting elements that are wholly integrated with floating image and depth effect generator 190, may include lighting elements controlled by but remote from floating image and depth effect generator 190, or may be partially integrated with floating image and depth effect generator 190 while including remote lighting elements. Lighting system 164 may include multiple light sources, and may be configured to provide light of varying intensity and varying colors, for example. For instance, lighting system 164 may include small spotlights configured to provide directional lighting that can be turned on or off, or be selectively dimmed and brightened.

Analogously, audio system 166 may be wholly integrated with floating image and depth effect generator 190, may include elements, such as audio speakers, controlled by but remote from floating image and depth effect generator 190, or may be partially integrated with floating image and depth effect generator 190 while including remote audio elements. In one implementation, audio system 166 may include a theater quality Dolby® high definition (HD) surround-sound system, for example. Moreover, audio system 166 may include a library of stored audio recordings that can be played back through audio system 166.

In some implementations, lighting system 164 and audio system 166 may be synchronized with floating image and depth effect generator 190 to produce an immersive multimedia experience. It is noted that sensor network 120 is described in greater detail below by reference to FIGS. 1B and 1C, while various implementations of floating image and depth effect generator 190 are described below by reference to FIGS. 2A, 2B, 3A, 4A, 5A, and 7.

Figure 1B:
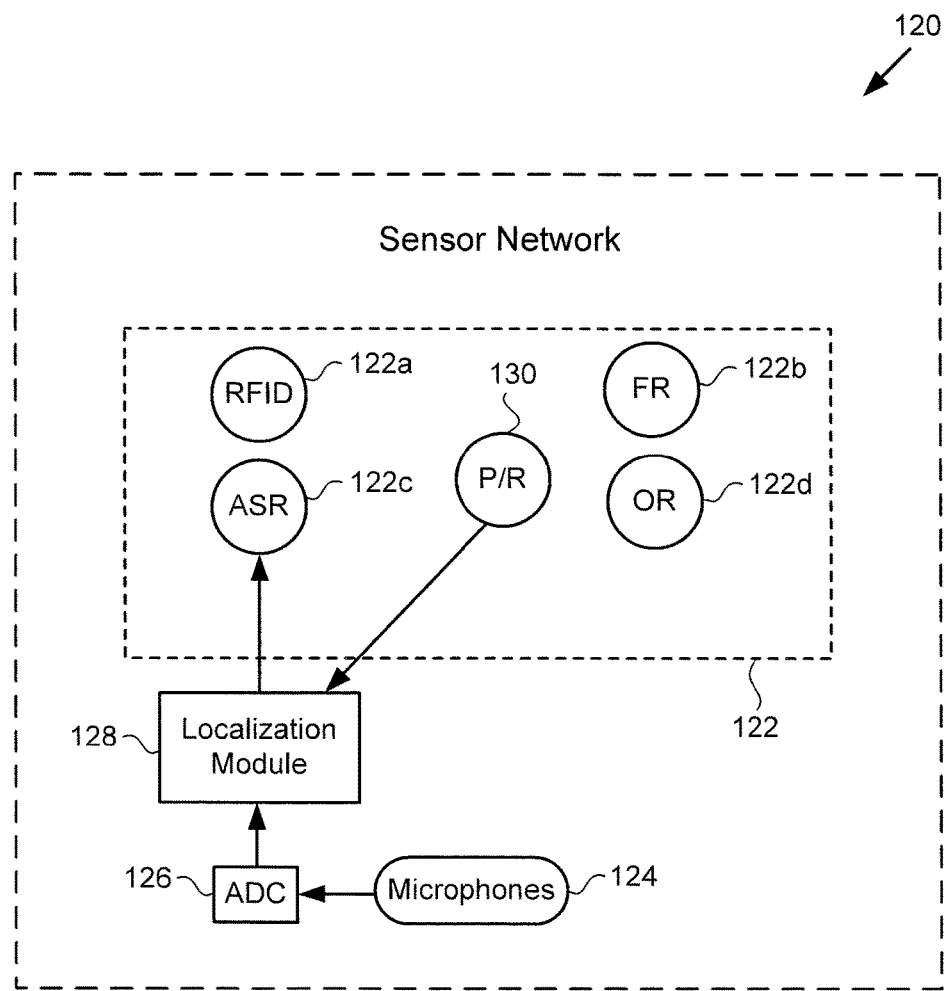
FIG. 1B shows a diagram of an exemplary sensor network suitable for use as part of the image display system of FIG. 1A, according to one implementation.

FIG. 1B shows a more detailed exemplary implementation of sensor network 120, in FIG. 1A. As shown in FIG. 1B, sensor network 120 includes multiple sensors 121, microphones 124, analog-to-digital converter (ADC) 126, and localization module 128. As further shown in FIG. 1B, sensors 121 of sensor network 120 may include radio-frequency identification (RFID) sensor 122a, facial recognition (FR) sensor 122b, automatic speech recognition (ASR) sensor 122c, object recognition (OR) sensor 122d, and one or more position and/or rate (P/R) sensor(s) 130.

It is noted that the specific sensors shown to be included among sensors 121 of sensor network 120 are merely exemplary, and in other implementations, sensors 121 of sensor network 120 may include more, or fewer, sensors than RFID sensor 122a, FR sensor 122b, ASR sensor 122c, OR sensor 122d, and P/R sensor(s) 130. RFID sensor 122a, FR sensor 122b, ASR sensor 122c, OR sensor 122d, and P/R sensor(s) 130 may be implemented using any suitable sensors for those respective functions, as known in the art. Microphones 124 may include stationary and/or moving microphones. For example, stationary microphones of microphones 124 may be distributed in a 360° array surrounding floating image 116 to enhance directional sensing of sound, such as speech, produced by one or more of users 168a and 168b.

In some implementations, one or more moving microphones of microphones 124 may rotate in synchronization with rotor 144 of floating image and depth effect generator 190. In those implementations, P/R sensor(s) 130 may be used in combination with microphones 124 to identify the direction from which a sound sensed using microphones 124 is received.

As indicated in FIG. 1B, in some implementations, data from P/R sensor(s) 130 and or data generated by ADC 126 from sounds detected by microphones 124 are processed by localization module 128 to identify the distance and/or direction of the respective sources of the sounds received by microphones 124. In those implementations, the output from localization module 128 may be provided to ASR sensor 122*c* to enhance the performance of ASR sensor 122*c* in discriminating among environmental sounds, noise, and purposeful speech by one or more of users 168*a* and 168*b*. As a result, in some implementations, the illusion of interactivity by floating image 116 can be further supported by the apparently appropriate acoustic and/or visual responsiveness of floating image 116 to the speech and/or actions of one or more of users 168*a* and 168*b*.

Figure 1C:
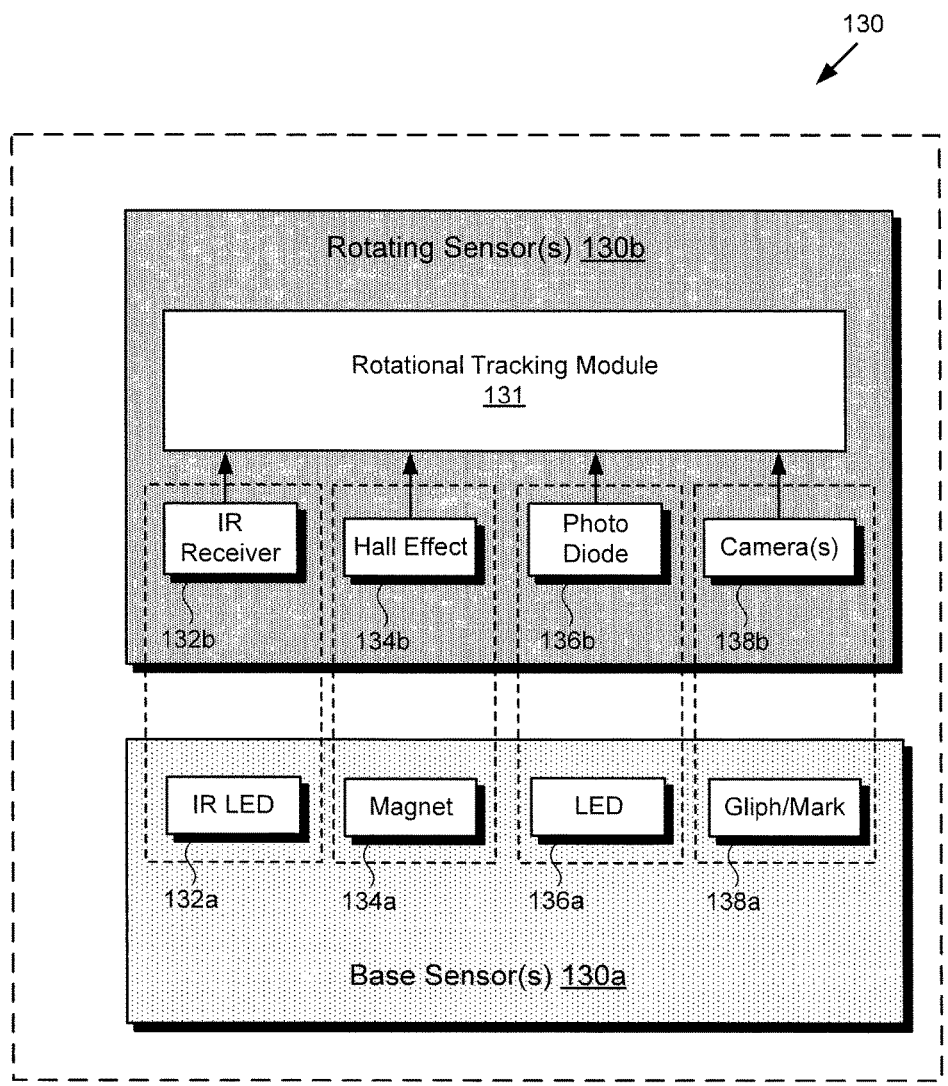
FIG. 1C shows a diagram of exemplary position and/or rate (P/R) sensors suitable for use as part of the image display system of FIG. 1A, according to one implementation.

FIG. 1C shows a more detailed exemplary implementation of P/R sensor(s) 130, in FIG. 1B. As shown in FIG. 1C, P/R sensor(s) 130 can include one or more base sensor(s) 130*a* integrated with base 140, and one or more rotating sensor(s) 130*b* integrated with floating image and depth effect generator 190 and configured to rotate with floating image and depth effect generator 190.

According to the exemplary implementation shown in FIG. 1C, base sensor(s) 130*a* may include one or more of infrared (IR) light-emitting diode (LED) 132*a*, magnet 134*a*, visible light LED 136*a*, and glyph or other visible marker 138*a*, to name a few examples. As further shown in FIG. 1C, rotating sensor(s) 130*b* may include one or more of IR receiver 132*b* for sensing IR LED 132*a*, Hall effect sensor 134*b* for sensing magnet 134*a*, photo diode 136*b* for sensing visible light LED 136*a*, and one or more camera(s) 138*b* for sensing glyph or visible marker 138*a*. In addition, rotating sensor(s) 130*b* are shown to be coupled to rotational tracking module 131.

It is noted that the distribution of features identified by reference numbers 132*a*, 134*a*, 136*a*, 138*a*, 132*b*, 134*b*, 136*b*, and 138*b* between base sensor(s) 130*a* and rotating sensor(s) unit 130*b* is merely exemplary. In another implementation, for example, the positions of features 132*a*, 134*a*, 136*a*, 138*a*, 132*b*, 134*b*, 136*b*, and 138*b* may be reversed. That is to say, one or more of IR LED 132*a*, magnet 134*a*, visible light LED 136*a*, and glyph or visible marker 138*a* may be included as rotating sensor(s) 130*b*, while one or more of IR receiver 132*b*, Hall effect sensor 134*b*, photo diode 136*b*, and camera(s) 138*b* may be included as base sensor(s) 130*a*. It is further noted that camera(s) 138*b* may include one or more still camera(s) and/or one or more video camera(s), for example.

As indicated in FIG. 1C, in some implementations, data from one or more of IR receiver 132*b*, Hall effect sensor 134*b*, photo diode 136*b*, and camera 138*b* is processed by rotational tracking module 131 to identify the rotational position of display screen 160 being tracked by P/R sensor(s) 130 at any point in time. In those implementations, the output from rotational tracking module 131 may be provided to software code 108 to enhance the performance of image display system 100 in rendering floating image 116 and volumetric enhancement 118 to floating image 116.

FIG. 2A shows a diagram of exemplary image display system 200, according to another implementation. As shown in FIG. 2A, image display system 200 includes floating image and depth effect generator 290 coupled to base 240 including motor 242 and motor controller circuit 248 by rotor 244. Base 240 is shown to be situated on surface 250, which may be a floor or any other substantially horizontal surface. According to the exemplary implementation shown in FIG. 2A, floating image and depth effect generator 290 includes display screen 260 having front display face 262*a* and side display face 262*b*, and may include optional privacy screen 258 affixed to front display face 262*a*. Also shown in FIG. 2A are horizontal axis 252 substantially parallel to surface 250, vertical axis 254 substantially perpendicular to surface 250, spin direction 256 of rotor 244 and display screen 260, and two-dimensional (2D) graphic 246 rendered on front display face 262*a* of display screen 260.

Image display system 200 corresponds in general to image display 100, in FIG. 1A. Thus, floating image and depth effect generator 290 including display screen 260 corresponds in general to floating image and depth effect generator 190 including display screen 160, in FIG. 1A. As a result, floating image and depth effect generator 290 and display screen 260 may share any of the features or functionality attributed to floating image and depth effect generator 190 and display screen 160 by the present disclosure, and vice versa. In other words, although not explicitly shown in FIG. 2A, floating image and depth effect generator 290 includes features corresponding respectively to computing platform 102, ASIC 110 having CPU 112, GPU 114, and DSP 115, and system memory 106 storing software code 108. Moreover, like floating image and depth effect generator 190, floating image and depth effect generator 290 may be configured to control, or may have integrated therein, lighting system 164, audio system 166, and/or sensor network 120.

In addition, rotor 244, and base 240 including motor 242 and motor controller circuit 248, correspond in general to rotor 144, and base 140 including motor 142 and motor controller circuit 148, in FIG. 1A. Thus, rotor 244 and base 240 may share any of the features or functionality attributed to rotor 144 and base 140, and vice versa.

Referring to FIGS. 1A and 2A in combination, according to the exemplary implementation shown in FIG. 2A, front display face 262*a* and side display face 262*b* of display screen 160/260 may be controlled by CPU 112 and/or GPU 114 of computing ASIC 110, while rotor 144/244 coupled to display screen 160/260 of floating image and depth effect generator 190/290 is controlled by CPU 112. CPU 112 is configured to execute software code 108 to render 2D graphic 246 on front display face 262*a* of display screen 160/260, and to render a visual effect on side display face 262*b* of display screen 160/260 (visual effect not shown in FIG. 2A).

CPU 112 is further configured to execute software code 108 to utilize motor 142/242 to spin rotor 144/244 and display screen 160/260 about vertical axis 154/254 to cause appearances of 2D graphic 246 as floating image 116 and to cause appearance of the visual effect as volumetric enhancement 118 to floating image 116. As a result of the image generation performed by floating image and depth effect generator 190/290, floating image 116 may appear to be a 3D image corresponding to 2D graphic 246 and may appear to be floating in space.

In some implementations, display screen 160/260 may be a liquid-crystal display (LCD) screen, for example. Moreover, in some implementations, display screen 160/260 may be provided by a mobile communication device included as part of image display system 100/200 and configured to spin with rotor 144/244 and display screen 160/260. For example, display screen 160/260 may be part of a smartphone or a tablet computer. It is noted that in implementations in which display screen 160/260 is part of a mobile communication device such as a smartphone or a tablet computer, one or more sensor(s) 121 and/or microphone(s) 124 of sensor network 120 may be features built into the mobile communication device.

In the implementation shown in FIG. 2A, various features and/or techniques may be utilized to reduce flicker and/or blur of floating image 116 generated by floating image and depth effect generator 190/290. For example, optional privacy screen 258 may be affixed to front display face 262a of display screen 160/260 so as to restrict viewing of front display face 262a outside of a predetermined viewing angle. Such a privacy screen may take the form of a louvered structure affixed to front display face 262a, or to a privacy film covering front display face 262a of display screen 260 (e.g. a 3M™ privacy screen protector).

Although, in some implementations, optional privacy screen 258 may be an advantageous or desirable feature for reducing flicker and/or blur, in some other implementations it may be preferable to omit optional privacy screen 258. For example, in implementations in which true volumetric images, such as surfaces of revolution, are to be displayed as floating image 116, privacy screen 258 may be preferentially omitted.

It is noted that CPU 112 may execute software code 108 to control motor 142/242 in order to spin rotor 144/244 and display screen 160/260 about vertical axis 154/254 at a varying spin rate, or at a substantially constant predetermined spin rate. It is also noted that spin direction 256 may be in either a counter clockwise direction with respect to the plane of horizontal axis 152/252, as shown in FIG. 2A, or in a clockwise direction with respect to that plane.

In some implementations, CPU 112 may execute software code 108 to use GPU 114 to change 2D graphic 246 as rotor 144/244 and display screen 160/260 rotate, so as to generate multiple perspectives of floating image 116 that are appropriate respectively to the locations of each of observers 168a and 168b. For example, observer 168a located so as to face a front side of floating image 116 and stationary at that location might consistently view floating image 116 from a frontal perspective. By contrast, observer 168b located so as to face a backside of floating image 116, i.e., 180° apart from the perspective of observer 168a, and stationary at that location might consistently view floating image 116 as if from the rear.

Figure 2B:
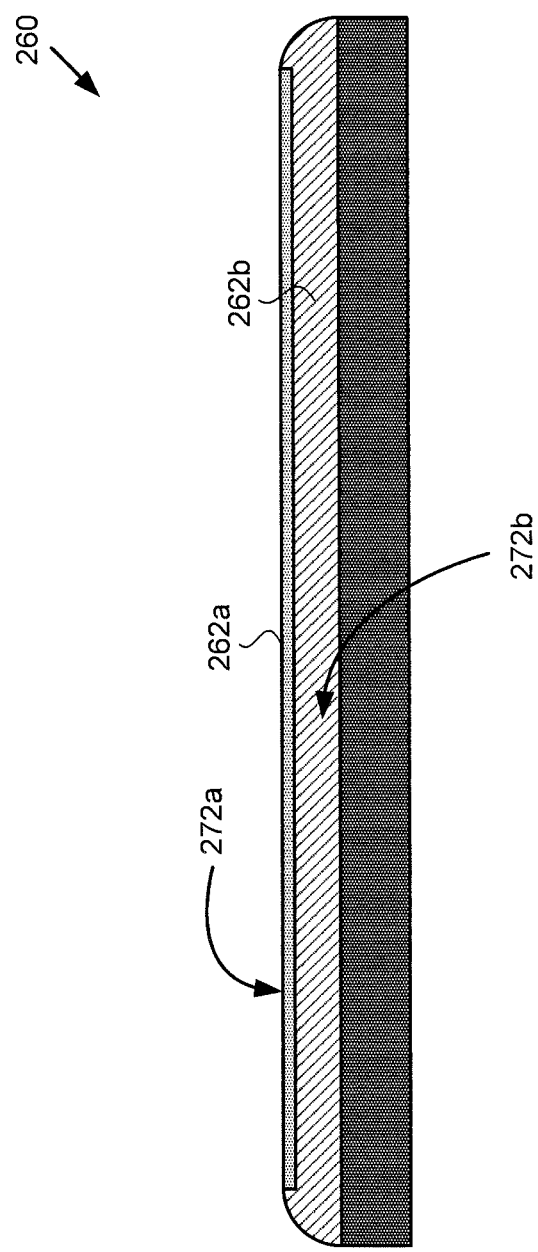
FIG. 2B shows a side view of an exemplary display screen suitable for use as part of a floating image and depth effect generator included in the system of FIG. 2A, according to one implementation.

FIG. 2B shows a side view of exemplary display screen 160/260 having front display face 262a and side display face 262b as though viewed along perspective lines 2B-2B in FIG. 2A. As shown in FIG. 2B, front display face 262a of display screen 160/260 may be a substantially flat display face, i.e., may have substantially flat display surface 272a. As further shown in FIG. 2B, by contrast, side display face 262b of display screen 160/260 may have curved display surface 272b. It is noted that in some implementations, side display face 262b may be an "edge display," as known in the art, and may border one, two, three, or all four sides of front display face 262a. That is to say, in some implementations, side display face 262b may surround front display face 262a.

Figure 3A:
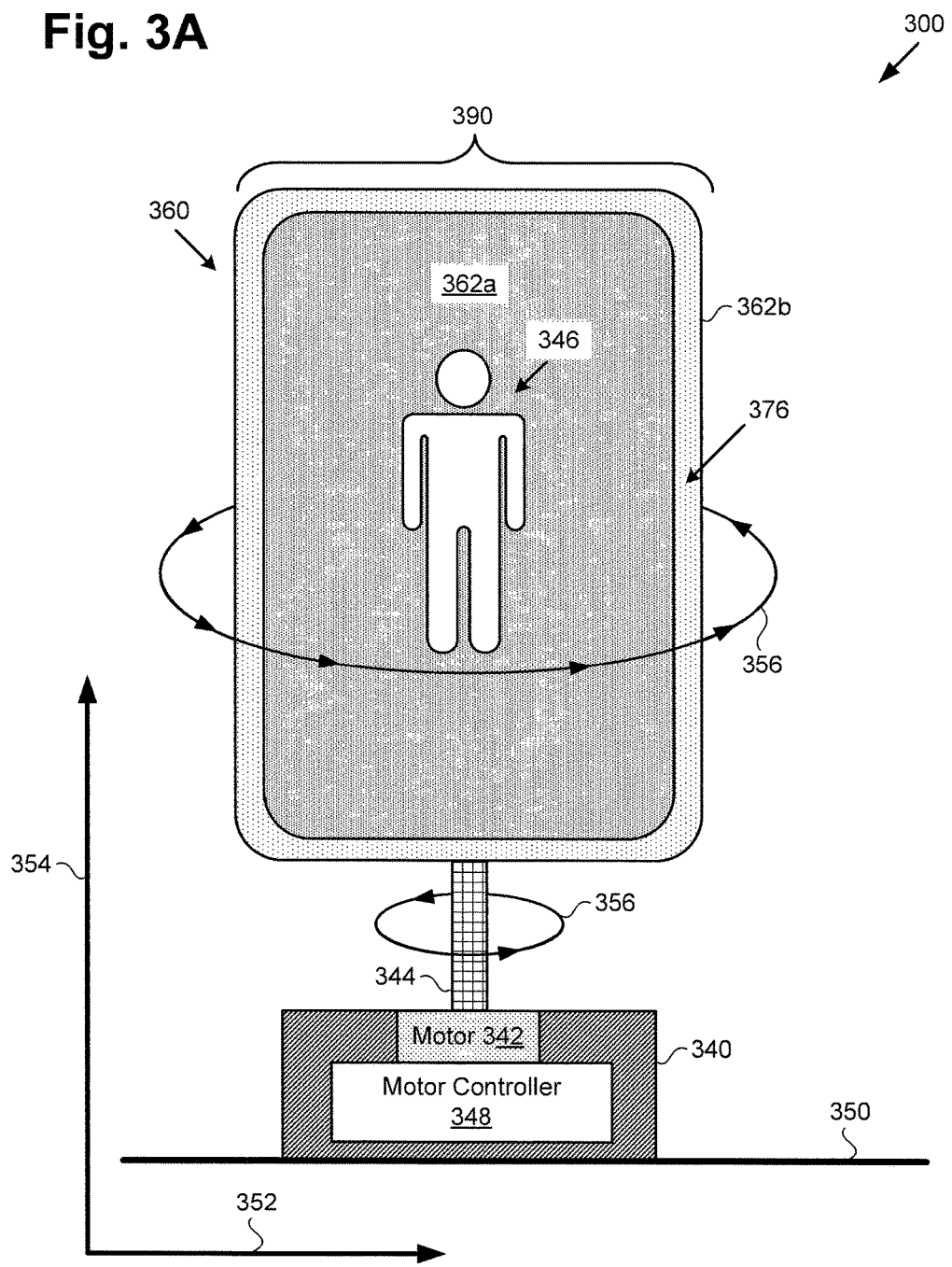
FIG. 3A shows the exemplary image display system of FIGS. 1A and 2A implemented so as to generate a depth effect enveloping a floating image.

FIG. 3A shows the exemplary image display system of FIGS. 1A and 2A implemented so as to generate a depth effect enveloping a floating image, according to one implementation. As shown in FIG. 3A, image display system 300 includes floating image and depth effect generator 390 coupled to base 340 including motor 342 and motor controller circuit 348 by rotor 344. Base 340 is shown to be situated on surface 350, which may be a floor or any other substantially horizontal surface. According to the exemplary implementation shown in FIG. 3A, floating image and depth effect generator 390 includes display screen 360 having front display face 362a and side display face 362b. Also shown in FIG. 3A are horizontal axis 352 substantially parallel to surface 350, vertical axis 354 substantially perpendicular to surface 350, spin direction 356 of rotor 344 and display screen 360, 2D graphic 346 rendered on front display face 362a of display screen 360, and visual effect 376 rendered on side display face 362b of display screen 360.

Image display system 300 corresponds in general to image display 100/200, in FIGS. 1A and 2A. Thus, floating image and depth effect generator 390 corresponds in general to floating image and depth effect generator 190/290. As a result, floating image and depth effect generator 390 may share any of the features or functionality attributed to floating image and depth effect generator 190/290 by the present disclosure, and vice versa. In other words, although not explicitly shown in FIG. 3A, floating image and depth effect generator 390 includes features corresponding respectively to computing platform 102, ASIC 110 having CPU 112, GPU 114, and DSP 115, and system memory 106 storing software code 108. Moreover, like floating image and depth effect generator 190/290, floating image and depth effect generator 390 may be configured to control, or may have integrated therein, lighting system 164, audio system 166, and/or sensor network 120.

In addition, rotor 344, and base 340 including motor 342 and motor controller circuit 348, correspond in general to rotor 144/244, and base 140/240 including motor 142/242 and motor controller circuit 148/248, in FIGS. 1A and 2A. Thus, rotor 344 and base 340 may share any of the features or functionality attributed to rotor 144/244 and base 140/240, and vice versa.

Furthermore, display screen 360 including front display face 362a and side display face 362b corresponds in general to display screen 160/260 including front display face 262a and side display face 262b, in FIGS. 1A, 2A, and 2B. Thus, display screen 360, front display face 362a, and side display face 362b may share any of the features or functionality attributed to display screen 160/260, front display face 262a, and side display face 262b by the present disclosure, and vice versa. In other words, like display screen 160/260, display screen 360 may be an LCD display including substantially flat front display face 362a, and side display face 362b having curved display surface 272b. Also like display screen 160/260, side display face 362b may be an edge display bordering or surrounding front display face 362a.

Figure 3B:
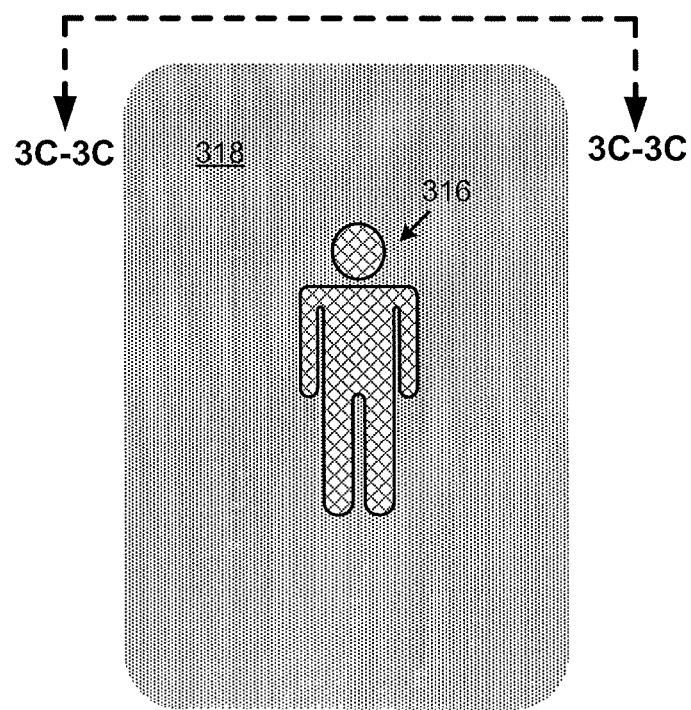
FIG. 3B shows an exemplary floating image and depth effect displayed using the implementation of FIG. 3A.

According to the implementation shown in FIG. 3A, visual effect 376 is rendered as a substantially uniform, lightly shaded effect over the surface of side display face 362b. Referring to FIG. 3B with additional reference to FIGS. 1A and 3A, FIG. 3B shows exemplary floating image 316 and volumetric enhancement 318 displayed using the implementation of FIG. 3A. It is noted that floating image 316 and volumetric enhancement 318 correspond respectively in general to floating image 116 and volumetric enhancement 118 in FIG. 1A. Thus, floating image 316 and volumetric enhancement 318 may share any of the characteristics attributed to floating image 116 and volumetric enhancement 118 by the present disclosure, and vice versa.

Figure 3C:
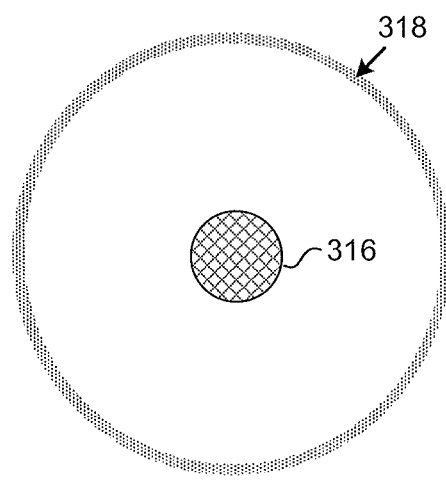
FIG. 3C shows a top view of the exemplary floating image and depth effect shown in FIG. 3B.

FIG. 3C shows a top view of floating image 116/316 and volumetric enhancement 118/318 along perspective lines 3C-3C in FIG. 3B. As shown by FIGS. 3B and 3C in combination with FIGS. 1A, 2A, and 3A, spinning of rotor 144/244/344 and display screen 160/260/360 about vertical axis 154/254/354 by motor 142/242/342 causes appearances of 2D graphic 246/346 as floating image 116/316 and causes appearances of visual effect 376 as volumetric enhancement 118/318 to floating image 116/316. As further shown by FIGS. 3B and 3C, volumetric enhancement 118/318 may appear to be a 3D vapor or mist surrounding and enveloping floating image 116/316, which may appear to be a 3D image floating in space.

Figure 4A:
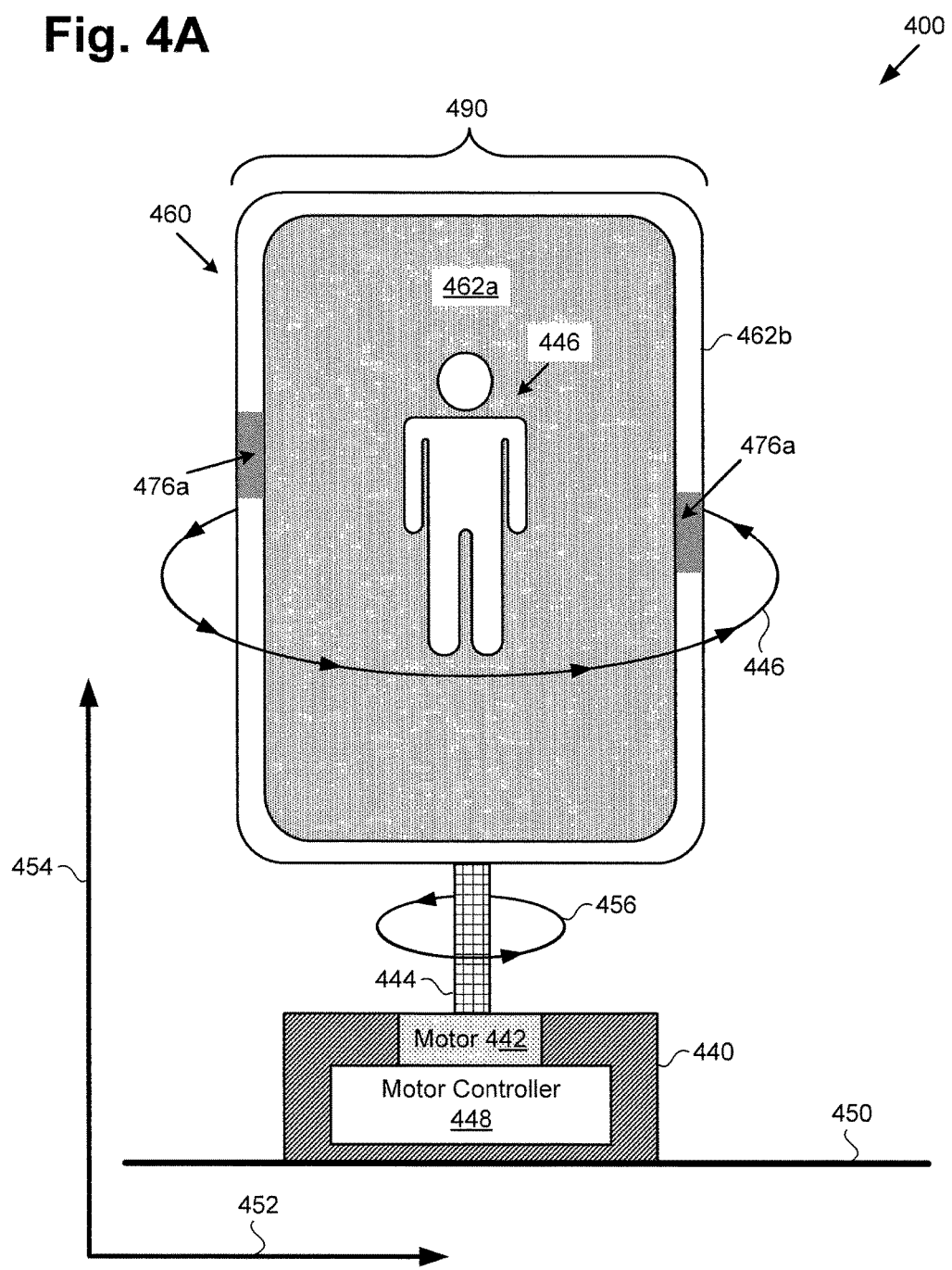
FIG. 4A shows the exemplary image display system of FIGS. 1A and 2A implemented so as to generate a depth effect apparently swirling around a floating image.

FIG. 4A shows the exemplary image display system of FIGS. 1A and 2A implemented so as to generate a depth effect apparently swirling around a floating image, according to one implementation. As shown in FIG. 4A, image display system 400 includes floating image and depth effect generator 490 coupled to base 440 including motor 442 and motor controller circuit 448 by rotor 444. Base 440 is shown to be situated on surface 450, which may be a floor or any other substantially horizontal surface. According to the exemplary implementation shown in FIG. 4A, floating image and depth effect generator 490 includes display screen 460 having front display face 462a and side display face 462b. Also shown in FIG. 4A are horizontal axis 452 substantially parallel to surface 450, vertical axis 454 substantially perpendicular to surface 450, spin direction 456 of rotor 444 and display screen 460, 2D graphic 446 rendered on front display face 462a of display screen 460, and visual effects 476a and 476b rendered on side display face 462b of display screen 460.

Image display system 400 corresponds in general to image display 100/200/300, in FIGS. 1A, 2A, and 3A. Thus, floating image and depth effect generator 490 corresponds in general to floating image and depth effect generator 190/290/390. As a result, floating image and depth effect generator 490 may share any of the features or functionality attributed to floating image and depth effect generator 190/290/390 by the present disclosure, and vice versa. In other words, although not explicitly shown in FIG. 4A, floating image and depth effect generator 490 includes features corresponding respectively to computing platform 102, ASIC 110 having CPU 112, GPU 114, and DSP 115, and system memory 106 storing software code 108. Moreover, like floating image and depth effect generator 190/290/390, floating image and depth effect generator 490 may be configured to control, or may have integrated therein, lighting system 164, audio system 166, and/or sensor network 120.

In addition, rotor 444, and base 440 including motor 442 and motor controller circuit 448, correspond in general to rotor 144/244/344, and base 140/240/340 including motor 142/242/342 and motor controller circuit 148/248/348, in FIGS. 1A, 2A, and 3A. Thus, rotor 444 and base 440 may share any of the features or functionality attributed to rotor 144/244/344 and base 140/240/340, and vice versa.

Furthermore, display screen 460 including front display face 462a and side display face 462b corresponds in general to display screen 160/260/360 including front display face 262a/362a and side display face 262b/362b, in FIGS. 1A, 2A, 2B, and 3A. Thus, display screen 460, front display face 462a and side display face 462b may share any of the features or functionality attributed to display screen 160/260/360, front display face 262a/362a and side display face 262b/362b by the present disclosure, and vice versa. In other words, like display screen 160/260/360, display screen 460 may be an LCD display including substantially flat front display face 462a, and side display face 462b having curved display surface 272b. Also like display screen 160/260/360, side display face 462b may be an edge display bordering or surrounding front display face 462a.

Figure 4B:
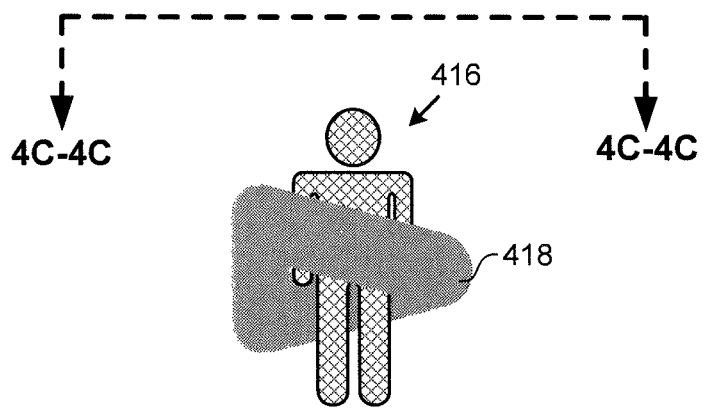
FIG. 4B shows an exemplary floating image and depth effect displayed using the implementation of FIG. 4A.

According to the implementation shown in FIG. 4A, visual effects 476a and 476b are rendered as vertically offset, shaded effects on opposite vertical edges of side display face 462b. Referring to FIG. 4B with additional reference to FIGS. 1A, 3B, 3C, and 4A, FIG. 4B shows exemplary floating image 416 and volumetric enhancement 418 displayed by the implementation of FIG. 4A. It is noted that floating image 416 and volumetric enhancement 418 correspond respectively in general to floating image 116/316 and volumetric enhancement 118/318 in FIGS. 1A, 3B, and 3C. Thus, floating image 416 and volumetric enhancement 418 may share any of the characteristics attributed to floating image 116/316 and volumetric enhancement 118/318 by the present disclosure, and vice versa.

Figure 4C:
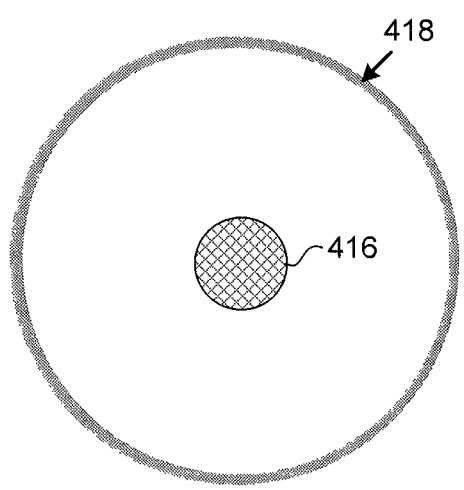
FIG. 4C shows a top view of the exemplary floating image and depth effect shown in FIG. 4B.

FIG. 4C shows a top view of floating image 116/416 and volumetric enhancement 118/418 along perspective lines 4C-4C in FIG. 4B. As shown by FIGS. 4B and 4C, in combination with FIGS. 2A, 3A, 3B, 3C, and 4A, spinning of rotor 144/244/344/444 and display screen 160/260/360/460 about vertical axis 154/254/354/454 by motor 142/242/342/442 causes appearances of 2D graphic 246/346/446 as floating image 116/316/416 and causes appearances of visual effects 476a and 476b as volumetric enhancement 118/418 to floating image 116/316/416. As further shown by FIGS. 4B and 4C, volumetric enhancement 118/418 may appear to be a 3D cloud or collection of dust, such as pixie dust or another type of magic dust for example, swirling around floating image 116/316/416, which may appear to be a 3D image floating in space.

Figure 5A:
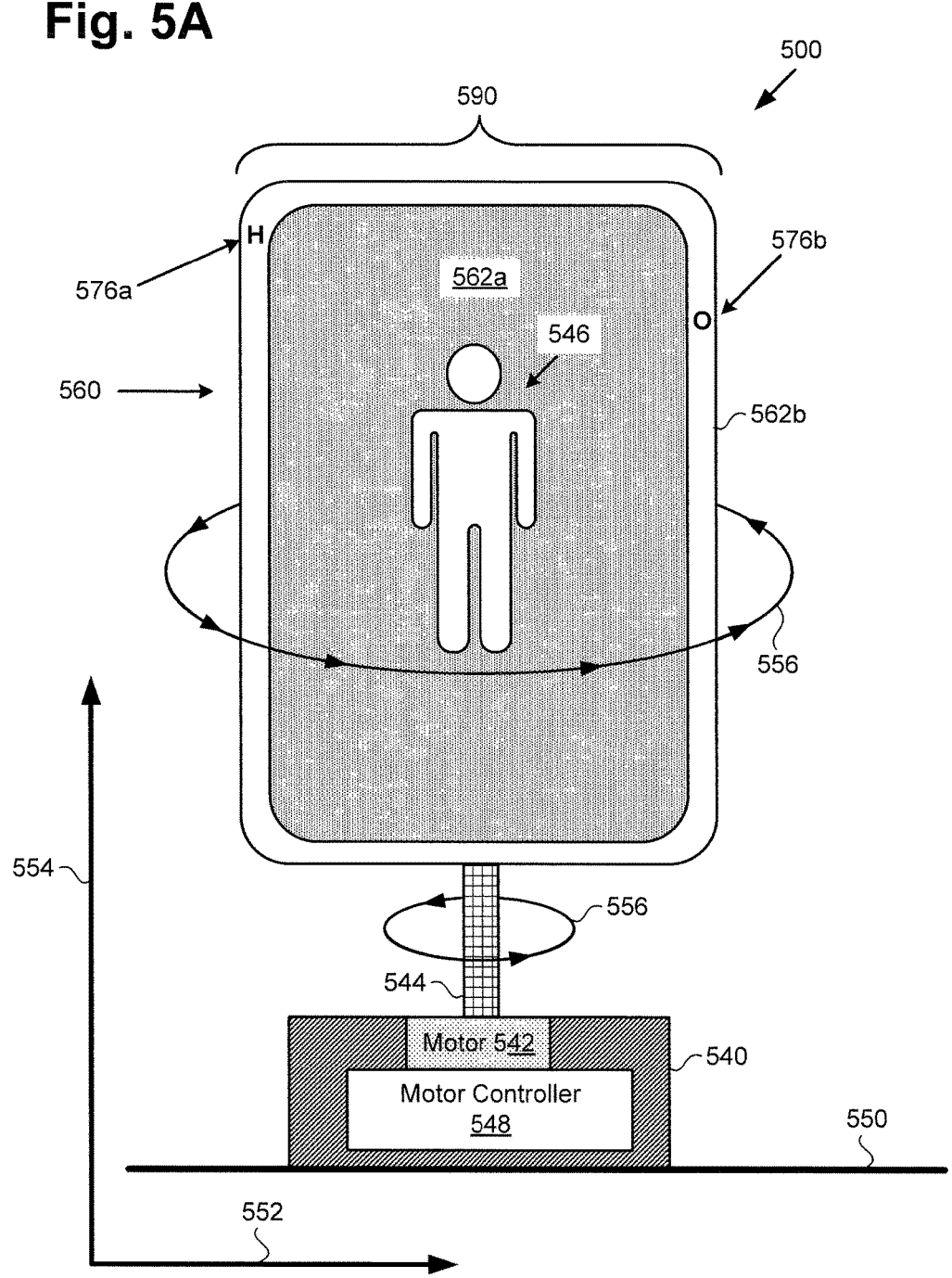
FIG. 5A shows the exemplary image display system of FIGS. 1A and 2A implemented so as to generate a depth effect in the form of alphanumeric characters.

FIG. 5A shows the exemplary image display system of FIGS. 1A and 2A implemented so as to generate a depth effect in the form of alphanumeric characters, according to one implementation. As shown in FIG. 5A, image display system 500 includes floating image and depth effect generator 590 coupled to base 540 including motor 542 and motor controller circuit 548 by rotor 544. Base 540 is shown to be situated on surface 550, which may be a floor or any other substantially horizontal surface. According to the exemplary implementation shown in FIG. 5A, floating image and depth effect generator 590 includes display screen 560 having front display face 562a and side display face 562b. Also shown in FIG. 5A are horizontal axis 552 substantially parallel to surface 550, vertical axis 554 substantially perpendicular to surface 550, spin direction 556 of rotor 544 and display screen 560, 2D graphic 546 rendered on front display face 562a of display screen 560, and visual effects 576a and 576b rendered on side display face 562b of display screen 560.

Image display system 500 corresponds in general to image display 100/200/300/400, in FIGS. 1A, 2A, 3A, and 4A. Thus, floating image and depth effect generator 590 corresponds in general to floating image and depth effect generator 190/290/390/490. As a result, floating image and depth effect generator 590 may share any of the features or functionality attributed to floating image and depth effect generator 190/290/390/490 by the present disclosure, and vice versa. In other words, although not explicitly shown in FIG. 5A, floating image and depth effect generator 590 includes features corresponding respectively to computing platform 102, ASIC 110 having CPU 112, GPU 114, and DSP 115, and system memory 106 storing software code 108. Moreover, like floating image and depth effect generator 190/290/390/490, floating image and depth effect generator 590 may be configured to control, or may have integrated therein, lighting system 164, audio system 166, and/or sensor network 120.

In addition, rotor 544, and base 540 including motor 542 and motor controller circuit 548, correspond in general to rotor 144/244/344/444, and base 140/240/340/440 including motor 142/242/342/442 and motor controller circuit 148/248/348/448, in FIGS. 1A, 2A, 3A, and 4A. Thus, rotor 544 and base 540 may share any of the features or functionality attributed to rotor 144/244/344/444 and base 140/240/340/440, and vice versa.

Furthermore, display screen 560 including front display face 562a and side display face 562b corresponds in general to display screen 160/260/360/460 including front display face 262a/362a/462a and side display face 262b/362b/462b, in FIGS. 1A, 2A, 2B, 3A, and 4A. Thus, display screen 560, front display face 562a and side display face 562b may share any of the features or functionality attributed to display screen 160/260/360/460, front display face 262a/362a/462a and side display face 262b/362b/462b by the present disclosure, and vice versa. In other words, like display screen 160/260/360/460, display screen 560 may be an LCD display including substantially flat front display face 562a, and side display face 562b having curved display surface 272b. Also like display screen 160/260/360/460, side display face 562b may be an edge display bordering or surrounding front display face 562a.

According to the implementation shown in FIG. 5A, visual effects 576a and 576b are rendered as vertically offset letters of the word "HELLO", i.e., "H" and "O", on opposite vertical edges of side display face 462b. It is noted that although exemplary visual effects 576a and 576b are depicted as letters in FIG. 5A, more generally, visual effects 576a and 576b can include any alphanumeric characters. Thus, in some implementations, one or more of visual effects 576a and 576b may be rendered as letters or numbers.

Figure 5B:
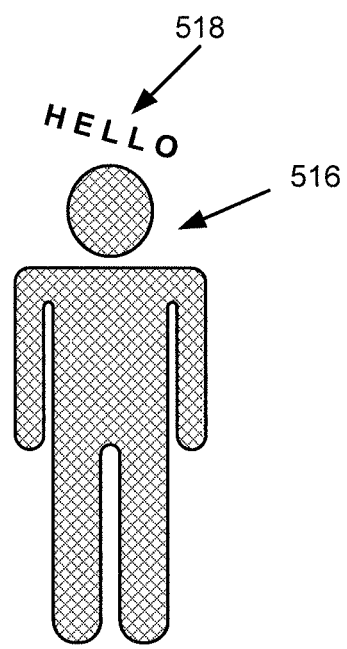
FIG. 5B shows an exemplary floating image and depth effect displayed using the implementation of FIG. 5A.

Referring to FIG. 5B with additional reference to FIGS. 1A, 3B, 3C, 4B, 4C, and 5A, FIG. 5B shows exemplary floating image 516 and volumetric enhancement 518 displayed using the implementation of FIG. 5A. It is noted that floating image 516 and volumetric enhancement 518 correspond respectively in general to floating image 116/316/416 and volumetric enhancement 118/318/418 in FIGS. 1A, 3B, 3C, 4B, and 4C. Thus, floating image 516 and volumetric enhancement 518 may share any of the characteristics attributed to floating image 116/316/416 and volumetric enhancement 118/318/418 by the present disclosure, and vice versa.

As shown by FIG. 5B, in combination with FIGS. 2A, 3A, 4A, and 5A, spinning of rotor 144/244/344/444/544 and display screen 160/260/360/460/560 about vertical axis 154/254/354/454/554 by motor 142/242/342/442/542 causes appearances of 2D graphic 246/346/446/546 as floating image 116/316/416/516 and causes appearances of visual effects 576a and 576b as volumetric enhancement 118/518 to floating image 116/316/416/516. As further shown by FIG. 5B, volumetric enhancement 118/518 may appear as a human readable word of greeting, e.g., "HELLO" appearing to curve over and/or around floating image 116/316/416/516 so as to have depth.

It is noted that visual images 576a and 576b may be rendered as different specific visual effects while rotor 144/244/344/444/544 and display screen 160/260/360/340/560 spin, in order to display volumetric enhancement 518. That is to say, the rendering of visual effects 576a and 576b may be synchronized with the spin rate of rotor 144/244/344/444/544 and display screen 160/260/360/340/560 so as to display words and or sequences of numbers, such as a time readout, that are readable or comprehensible to users 168a and 168b.

Figure 6:
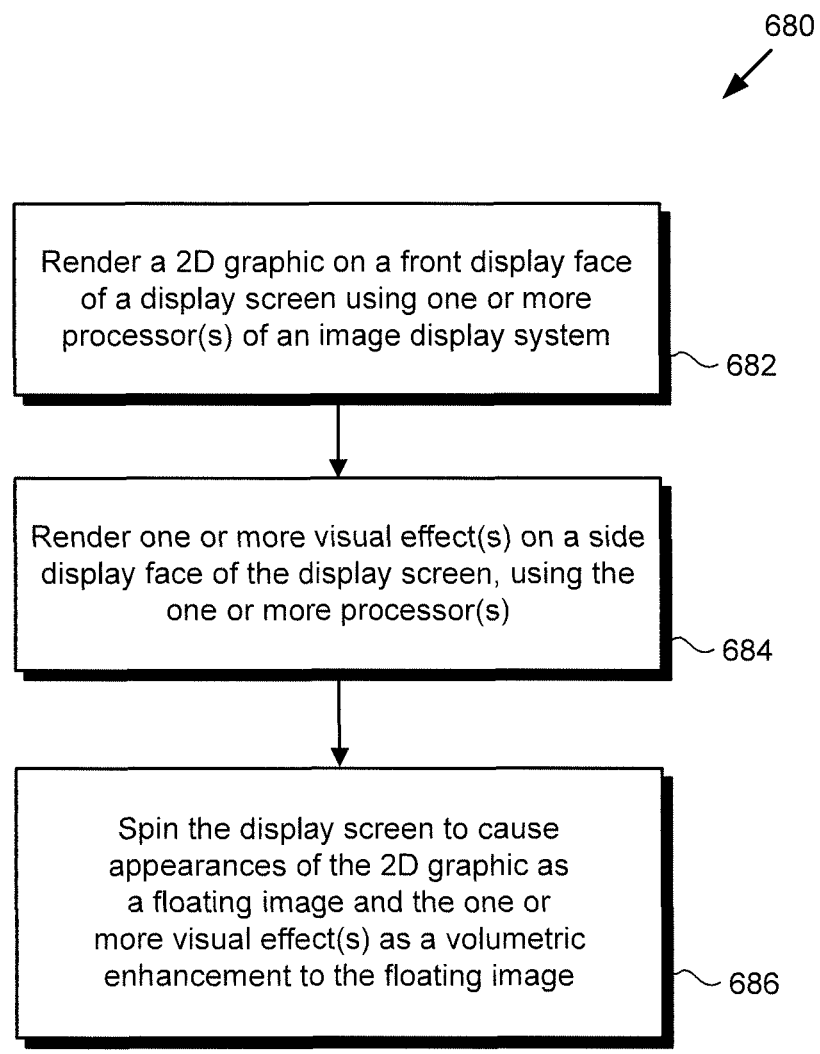
FIG. 6 shows a flowchart outlining an exemplary method for displaying a floating image with depth enhancement, according to one implementation.

The functionality of image display system 100 including floating image and depth effect generator 190/290/390/490/590 will be further described by reference to FIG. 6. FIG. 6 shows flowchart 680 of an exemplary method for displaying a floating image with depth enhancement, according to one implementation. With respect to the method outlined in FIG. 6, it is noted that certain details and features have been left out of flowchart 680 in order not to obscure the discussion of the inventive features in the present application.

Referring to FIG. 6 in combination with FIGS. 1A, 2A, 2B, 3A, 3B, 3C, 4A, 4B, 4C, 5A, and 5B, flowchart 680 begins with rendering 2D graphic 246/346/446/546 on front display face 262a/362a/462a/562a of display screen 160/260/360/460/560 using one or more processors of image display system 100/200/300/400/500 (action 682). Rendering of 2D graphic 246/346/446/546 on front display face 262a/362a/462a/562a of display screen 160/260/360/460/560 may be performed by software code 108, executed by CPU 112 of ASIC 110, and, according to some implementations, using GPU 114 of ASIC 110.

In some implementations, the same 2D graphic 246/346/446/546 may be rendered and periodically refreshed on front display face 262a/362a/462a/562a of display screen 160/260/360/460/560. In those implementations, users 168a and 168b having different locations relative to floating image 116/316/416/516 would nevertheless view the same perspective of floating image 116/316/416/516, for example a frontal perspective.

However, in other implementations, it may be advantageous or desirable to render multiple successive perspectives of 2D graphic 246/346/446/546 in order to provide users 168a and 168b with multiple perspectives of floating image 116/316/416/516 that are appropriate respectively to the locations of each of observers 168a and 168b. For example, and as noted above, observer 168a located so as to face a front side of floating image 116/316/416/516 and stationary at that location might consistently view floating image 116/316/416/516 from a frontal perspective. By contrast, observer 168b located so as to face a backside of floating image 116/316/416/516, i.e., 180° apart from the perspective of observer 168a, and stationary at that location might consistently view floating image 116/316/416/516 as if from the rear.

Flowchart 680 may continue with rendering one or more visual effect(s) 376/476a/476b/576a/576b on side display face 262b/362b/462b/562b of display screen 160/260/360/460/560 (action 684). Rendering of one or more visual effect(s) 376/476a/476b/576a/576b on side display face 262b/362b/462b/562b of display screen 160/260/360/460/560 may be performed by software code 108, executed by CPU 112 of ASIC 110, and, according to some implementations, using GPU 114 of ASIC 110.

In some implementations, as shown for example by FIGS. 3A and 4A, the same visual effect 376 or effects 476a and 476b may be rendered and periodically refreshed on side display face 262b/362b/462b/562b of display screen 160/260/360/460/560. However, in other implementations, as shown by FIGS. 5A and 5B, it may be advantageous or desirable to render multiple successive visual effects 576a and 576b in order to display words and or sequences of numbers, such as a time readout, that are readable or comprehensible to users 168a and 168b.

Flowchart 680 may conclude with spinning display screen 160/260/360/460/560 to cause appearances of 2D graphic 246/346/446/546 as floating image 116/316/416/516 and to cause appearances of one or more visual effect(s) 376/476a/476b/576a/576b as volumetric enhancement 118/318/418/518 to floating image 116/316/416/516 (action 686). CPU 112 of ASIC 110 may be configured to execute software code 108 to control motor 142/242/342/442/542 to spin rotor 144/244/344/444/544 and display screen 160/260/360/460/560 about vertical axis 154/254/354/454/554 parallel to front display face 262a/362a/462a/562a of display screen 160/260/360/460/560 at a variable spin rate, or at a predetermined spin rate, which may be on the order of approximately one or more tens or hundreds of rotations per second, for example.

According to various implementations of the present inventive concepts, the spin rate of rotor 144/244/344/444/544 and display screen 160/260/360/460/560 may depend in part on the frame rate of floating image and depth effect generator 190/290/390/490/590. As known in the art, the term "frame rate" refers to the rate or frequency with which a new frame can be rendered on a display, expressed in frames per second (fps). Thus, frame rate is to be distinguished from refresh rate, which is the rate or frequency with which the same frame can be redrawn on a display.

In addition to the frame rate of floating image and depth effect generator 190/290/390/490/590, the spin rate with which rotor 144/244/344/444/544 and display screen 160/260/360/460/560 spin or rotate may be based on the number of perspectives of floating image 116/316/416/516 and/or volumetric enhancement 118/318/418/518 to floating image 116/316/416/516 being displayed by image display system 100. For example, in the implementation shown by FIGS. 5A and 5B, the spin rate of rotor 144/244/344/444/544 and display screen 160/260/360/460/560 would be predetermined so as to enable display of the word "HELLO" as volumetric enhancement 518 wrapping at least partially around floating image 116/316/416/516.

Figure 7:
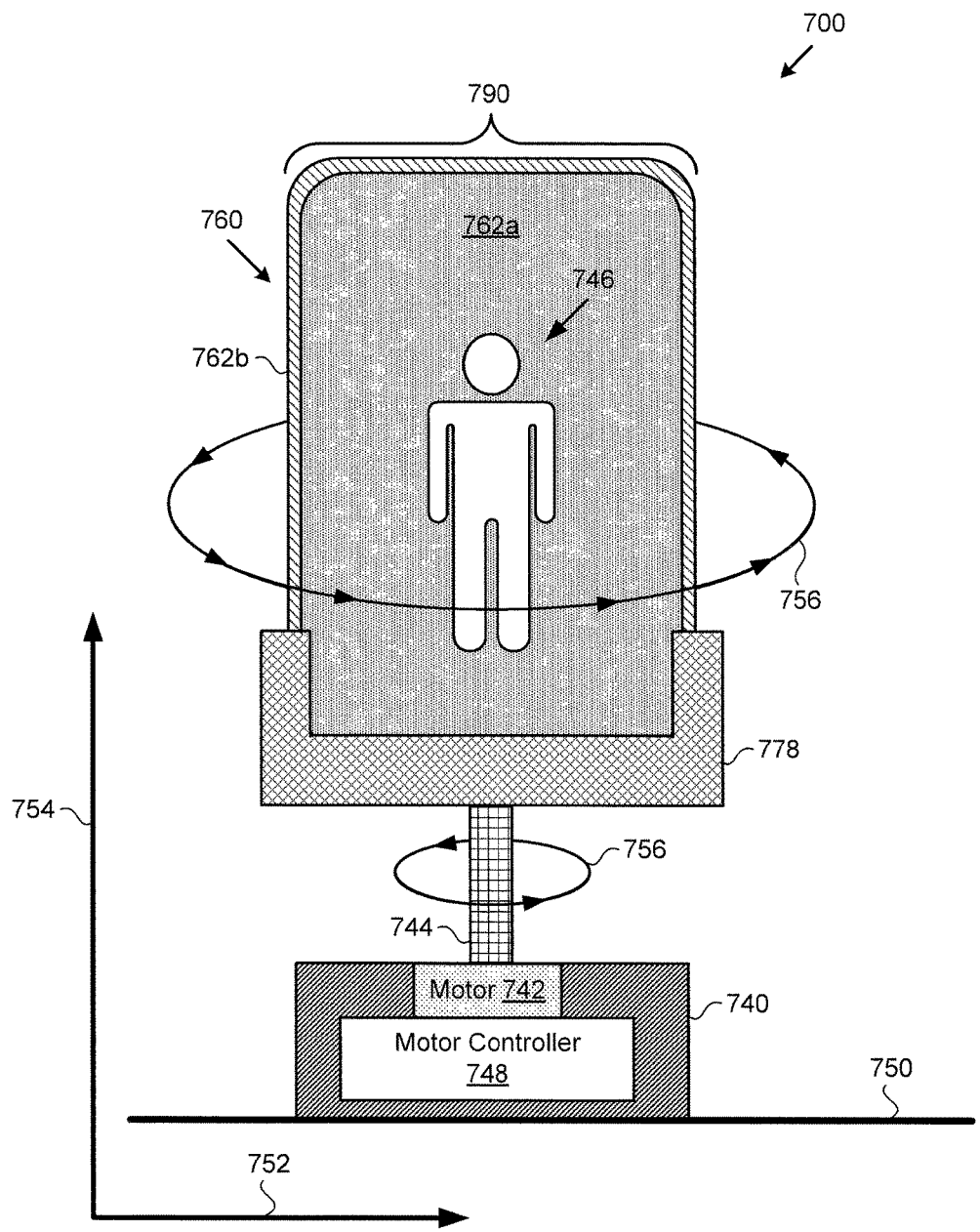
FIG. 7 shows a diagram of an exemplary image display system, according to yet another implementation.

FIG. 7 shows a diagram of exemplary image display system 700, according to yet another implementation. As shown in FIG. 7, image display system 700 includes rotor 744 coupled to base 740 having integrated motor 742 and motor controller circuitry 748. Base 740 is shown to be situated on surface 750, which may be a floor or any other substantially horizontal surface. In addition, according to the exemplary implementation shown in FIG. 7, image display system 700 includes mobile communication device 790 providing display screen 760 having front display face 762a and side display face 762b. Also shown in FIG. 7 are horizontal axis 752 substantially parallel to surface 750, vertical axis 754 substantially perpendicular to surface 450, bracket 778 for receiving mobile communication device 790 coupled to rotor 744, spin direction 756 of rotor 744 and bracket 778, as well as 2D graphic 746 rendered on front display face 762a of display screen 760.

Image display system 700 corresponds in general to image display system 100, in FIG. 1A. Thus, image display system 700 may share any of the features or functionality attributed to image display system 100 by the present disclosure, and vice versa. In other words, although not explicitly shown in FIG. 7, mobile communication device 790 may include features corresponding respectively to computing platform 102, ASIC 110 having CPU 112, GPU 114, and DSP 115, and system memory 106 storing software code 108. Moreover, and although also not shown in FIG. 7, image display system 700 can include features corresponding to either or both of lighting system 164, and audio system 166, either or both of which may be integrated into mobile communication device 790, for example.

In addition, base 740, motor 742, and rotor 744 of image display system 700 correspond respectively in general to base 140/240/340/440/540, motor 142/242/342/442/542, and rotor 144/244/344/444/544 in FIGS. 1A, 2A, 3A, 4A, and 5A. That is to say, base 740, motor 742, and rotor 744 may share any of the features and functionality attributed to respective base 140/240/340/440/540, motor 142/242/342/442/542, and rotor 144/244/344/444/544 by the present disclosure, and vice versa.

Display screen 760 including front display face 762a and side display face 762b corresponds in general to display screen 160/260/360/460/560 including front display face 262a/362a/462a/562a and side display face 262b/362b/462b/562b. Thus, display screen 760, front display face 762a and side display face 762b may share any of the features or functionality attributed to display screen 160/260/360/460/560, front display face 262a/362a/462a/562a and side display face 262b/362b/462b/562b by the present disclosure, and vice versa. In other words, like display screen 160/260/360/460/560, display screen 760 may be an LCD display including substantially flat front display face 762a, and side display face 762b having curved display surface 272b. Also like display screen 160/260/360/460/560, side display face 762b may be an edge display bordering or surrounding front display face 762a.

According to the exemplary implementation shown in FIG. 7, mobile communication device 790 providing display screen 160/260/360/460/560/760 may be an off-the-shelf consumer electronics device, such as a smartphone, tablet computer, or digital media player, to name a few examples. Mobile communication device 790 may be coupled to base 140/240/340/440/540/740 and rotor 144/244/344/444/544/744 by being situated in bracket 778 configured to receive and securely hold mobile communication device 790 while rotor 144/244/344/444/544/744, bracket 778, and mobile communication device 790 spin. CPU 112 of computing platform ASIC 110 is configured to execute software code 108 to render 2D graphic 246/346/446/546/746 on front display face 262a/362a/462a/562a/762a of display screen 160/260/360/460/560/760, and to render one or more visual effect(s) 376/476a/476b/576a/576b on side display face 262b/362b/462b/562b/762b of display screen 160/260/360/460/560/760. CPU 112 is further configured to execute software code 108 to utilize motor controller circuitry 748, through wired or wireless communication with base 740 including motor controller circuitry 748, for example, to control motor 142/242/342/442/542/742 to spin rotor 144/244/344/444/544/744, bracket 778, and mobile communication device 790 providing display screen 160/260/360/460/560/760.

Spinning of rotor 144/244/344/444/544/744, bracket 778, and mobile communication device 790 providing display screen 160/260/360/460/560/760 about vertical axis 154/254/354/454/554/754 causes appearances of 2D graphic 246/346/446/546/746 as floating image 116/316/416/516 and causes appearances of one or more visual effect(s) 376/476a/476b/576a/576b as volumetric enhancement 118/318/418/518 to floating image 116/316/416/516. As a result of the image generation performed by image display system 100/200/300/400/500/700, floating image 116/316/416/516 may appear to be a 3D image corresponding to 2D graphic 246/346/446/546/746, and may appear to be floating in space.

Thus, the present application discloses systems and methods for displaying a floating image with depth enhancement. By spinning a display screen having a front display face upon which a 2D image is rendered, the present display solution is capable of generating an apparently floating image that may appear to be 3D. In addition, by rendering one or more visual effect(s) on a side display face of the spinning display screen, the present display solution advantageously causes the visual effect to appear as a volumetric enhancement to the floating image.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. An image display system comprising:
a computing platform including at least one processor and a system memory storing a software code;
a display screen, the display screen having a front display face and a side display face;
a base including a motor coupled to a rotor for rotating the display screen;
the at least one processor configured to execute the software code to:
render a two-dimensional (2D) graphic on the front display face of the display screen;
render a visual effect on the side display face of the display screen; and
spin the display screen to cause appearances of the 2D graphic as a floating image and the visual effect as a volumetric enhancement to the floating image.

2. The image display system of claim 1, wherein the floating image appears to be a three-dimensional (3D) floating image.

3. The image display system of claim 1, wherein the side display face of the display screen has a curved display surface.

4. The image display system of claim 1, wherein the side display face of the display screen comprises an edge display bordering the front display face.

5. The image display system of claim 1, wherein the side display face of the display screen surrounds the front display face.

6. The image display system of claim 1, wherein the display screen comprises a liquid-crystal display (LCD) screen.

7. The image display system of claim 1, further comprising a mobile communication device, the mobile communication device providing the display screen and configured to spin with the display screen.

8. The image display system of claim 7, wherein the mobile communication device comprises the computing platform.

9. The image display system of claim 7, wherein the mobile communication device comprises a tablet computer.

10. The image display system of claim 7, wherein the mobile communication device comprises a smartphone.

11. A method for use by an image display system including a display screen having a front display face and a side display face, a base including a motor coupled to a rotor for rotating the display screen, and a computing platform having at least one processor and a system memory storing a software code, the method comprising:
rendering, using the at least one processor, a two-dimensional (2D) graphic on the front display face of the display screen;
rendering, using the at least one processor, a visual effect on the side display face of the display screen; and
spinning, using the at least one processor, the display screen to cause appearances of the 2D graphic as a floating image and the visual effect as a volumetric enhancement to the floating image.

12. The method of claim 11, wherein the floating image appears to be a three-dimensional (3D) floating image.

13. The method of claim 11, wherein the side display face of the display screen has a curved display surface.

14. The method of claim 11, wherein the side display face of the display screen comprises an edge display bordering the front display face.

15. The method of claim 11, wherein the side display face of the display screen surrounds the front display face.

16. The method of claim 11, wherein the display screen comprises a liquid-crystal display (LCD) screen.

17. The method of claim 11, wherein the image display system further comprises a mobile communication device, the mobile communication device providing the display screen and configured to spin with the display screen.

18. The method of claim 17, wherein the mobile communication device comprises the computing platform.

19. The method of claim 17, wherein the mobile communication device comprises a tablet computer.

20. The method of claim 17, wherein the mobile communication device comprises a smartphone.

* * * * *